(12) United States Patent
Namburu

(10) Patent No.: US 11,310,901 B2
(45) Date of Patent: Apr. 19, 2022

(54) PLASMA TORCH AND COMPONENTS THEREOF

(71) Applicant: Lincoln Global, Inc., Santa Fe Springs, CA (US)

(72) Inventor: Praveen K. Namburu, Little Elm, TX (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 211 days.

(21) Appl. No.: 16/383,854

(22) Filed: Apr. 15, 2019

(65) Prior Publication Data

US 2019/0246483 A1 Aug. 8, 2019

Related U.S. Application Data

(62) Division of application No. 15/236,360, filed on Aug. 12, 2016, now Pat. No. 10,863,610.

(60) Provisional application No. 62/241,077, filed on Oct. 13, 2015, provisional application No. 62/211,293, filed on Aug. 28, 2015.

(51) Int. Cl.
*H05H 1/34* (2006.01)
*B23K 10/00* (2006.01)
*B23K 35/02* (2006.01)

(52) U.S. Cl.
CPC .............. *H05H 1/34* (2013.01); *B23K 10/00* (2013.01); *B23K 35/0205* (2013.01); *H05H 1/3436* (2021.05); *H05H 1/3442* (2021.05); *H05H 1/3447* (2021.05); *H05H 1/3468* (2021.05); *H05H 1/3478* (2021.05); *H05H 1/3489* (2021.05)

(58) Field of Classification Search
None
See application file for complete search history.

(56) References Cited

U.S. PATENT DOCUMENTS

| | | | | |
|---|---|---|---|---|
| 2,336,570 A | * | 12/1943 | Rabezzana | H01T 13/05 123/169 PH |
| 4,967,055 A | | 10/1990 | Raney et al. | |
| 5,336,015 A | * | 8/1994 | Stewart | H05B 7/14 403/296 |
| 5,464,962 A | | 11/1995 | Luo et al. | |

(Continued)

FOREIGN PATENT DOCUMENTS

| DE | 102004049445 A1 | 4/2006 |
|---|---|---|
| DE | 202006018163 U1 | 3/2007 |

(Continued)

OTHER PUBLICATIONS

International Application No. PCT/IB2015/001412, International Search Report & Written Opinion, 12 pages, dated Feb. 9, 2016.

(Continued)

*Primary Examiner* — Phuong T Nguyen
(74) *Attorney, Agent, or Firm* — Brad C. Spencer

(57) ABSTRACT

Embodiments of the present invention include a plasma cutting torch and plasma cutting torch components, such as electrodes, cathodes, retainer caps, etc. having a unique physical features, including threads relationships. Embodiments include torch components having modified square thread with a specialized thread configuration including a particular relationship between thread crest and root, and included angles of thread sidewalls.

6 Claims, 13 Drawing Sheets

(56) References Cited

U.S. PATENT DOCUMENTS

| | | | |
|---|---|---|---|
| 5,498,035 A * | 3/1996 | Blose | E21B 17/042 |
| | | | 285/94 |
| 5,601,734 A | 2/1997 | Luo et al. | |
| 5,695,662 A | 12/1997 | Couch, Jr. et al. | |
| 5,747,767 A | 5/1998 | Severance et al. | |
| 5,756,959 A | 5/1998 | Freeman et al. | |
| 5,767,478 A | 6/1998 | Walters | |
| 5,841,095 A | 11/1998 | Lu et al. | |
| 5,886,315 A | 3/1999 | Lu et al. | |
| 5,977,510 A | 11/1999 | Lindsay et al. | |
| 5,994,663 A | 11/1999 | Lu | |
| 6,020,572 A | 2/2000 | Marner et al. | |
| 6,066,827 A | 5/2000 | Nemchinsky | |
| 6,084,199 A | 7/2000 | Lindsay et al. | |
| 6,114,650 A | 9/2000 | Marner et al. | |
| 6,130,399 A | 10/2000 | Lu et al. | |
| 6,207,923 B1 | 3/2001 | Lindsay et al. | |
| 6,403,915 B1 | 6/2002 | Cook et al. | |
| 6,423,922 B1 | 7/2002 | Nemchinsky et al. | |
| 6,424,082 B1 | 7/2002 | Hackett et al. | |
| 6,452,130 B1 | 9/2002 | Qian et al. | |
| 6,483,070 B1 | 11/2002 | Diehl et al. | |
| 6,614,001 B2 | 9/2003 | Hackett et al. | |
| 6,686,559 B1 | 2/2004 | Walters et al. | |
| 6,841,754 B2 | 1/2005 | Cook et al. | |
| 6,946,617 B2 | 9/2005 | Brandt et al. | |
| 6,969,819 B1 | 11/2005 | Griffin et al. | |
| 7,019,255 B2 | 3/2006 | Brandt et al. | |
| 7,081,597 B2 | 7/2006 | Severance et al. | |
| 7,193,174 B2 | 3/2007 | Brandt et al. | |
| 7,256,366 B2 | 8/2007 | Severance, Jr. et al. | |
| 7,375,302 B2 | 5/2008 | Twarog et al. | |
| 7,375,303 B2 | 5/2008 | Twarog et al. | |
| 7,423,235 B2 | 9/2008 | Severance, Jr. et al. | |
| 7,435,925 B2 | 10/2008 | Griffin et al. | |
| 7,598,473 B2 | 10/2009 | Cook et al. | |
| 7,605,340 B2 | 10/2009 | Duan et al. | |
| 7,659,488 B2 | 2/2010 | Cook et al. | |
| 7,754,993 B2 | 7/2010 | Ortega et al. | |
| 7,829,816 B2 | 11/2010 | Duan et al. | |
| 7,989,727 B2 | 8/2011 | Twarog et al. | |
| 8,035,055 B2 | 10/2011 | Twarog et al. | |
| 8,089,025 B2 | 1/2012 | Sanders et al. | |
| 8,097,828 B2 | 1/2012 | Roberts et al. | |
| 8,101,882 B2 | 1/2012 | Mather et al. | |
| D654,104 S | 2/2012 | Fitzpatrick et al. | |
| 8,115,136 B2 | 2/2012 | Mather et al. | |
| 8,153,927 B2 | 4/2012 | Twarog et al. | |
| 8,212,173 B2 | 7/2012 | Liebold et al. | |
| 8,304,684 B2 | 11/2012 | Smith et al. | |
| 8,338,740 B2 | 12/2012 | Liebold et al. | |
| 8,389,887 B2 | 3/2013 | Currier et al. | |
| 8,395,077 B2 | 3/2013 | Duan et al. | |
| 8,525,069 B1 | 9/2013 | Mather et al. | |
| 8,541,712 B2 | 9/2013 | Mather et al. | |
| D692,402 S | 10/2013 | Dalton et al. | |
| 8,546,718 B2 | 10/2013 | Mather et al. | |
| 8,546,719 B2 | 10/2013 | Warren, Jr. et al. | |
| 8,581,139 B2 | 11/2013 | Severance, Jr. et al. | |
| 8,633,417 B2 | 1/2014 | Ashtekar et al. | |
| 8,698,036 B1 | 4/2014 | Komprobst et al. | |
| 8,759,709 B2 | 6/2014 | Mather et al. | |
| 8,772,667 B2 | 7/2014 | Yang et al. | |
| 8,829,385 B2 | 9/2014 | Yang et al. | |
| 2002/0185475 A1 | 12/2002 | Horner-Richardson et al. | |
| 2004/0169018 A1 | 9/2004 | Brasseur et al. | |
| 2006/0049150 A1* | 3/2006 | Severance | H05H 1/34 |
| | | | 219/121.52 |
| 2006/0140739 A1* | 6/2006 | Komine | B23G 5/06 |
| | | | 411/308 |
| 2006/0163216 A1 | 7/2006 | Brandt et al. | |
| 2012/0012560 A1 | 1/2012 | Roberts et al. | |
| 2012/0074692 A1* | 3/2012 | Chelette | F16L 15/001 |
| | | | 285/333 |
| 2013/0043224 A1 | 2/2013 | Leiteritz et al. | |
| 2013/0306607 A1 | 11/2013 | Mather et al. | |
| 2014/0021175 A1 | 1/2014 | Chen et al. | |
| 2014/0110382 A1 | 4/2014 | Beliveau et al. | |

FOREIGN PATENT DOCUMENTS

| | | |
|---|---|---|
| EP | 0729805 A1 | 4/1996 |
| EP | 0790756 A2 | 8/1997 |
| WO | 1999053734 A1 | 10/1999 |
| WO | 200028794 A1 | 5/2000 |
| WO | 2006113737 A2 | 10/2006 |
| WO | 2008101226 A1 | 2/2008 |
| WO | 2010111695 A1 | 9/2010 |
| WO | 2012118826 A1 | 9/2012 |
| WO | 2014187438 A1 | 11/2014 |

OTHER PUBLICATIONS

International Application No. PCT/IB2015/000683 International Search Report & Written Opinion, 12 pages, dated Aug. 31, 2015.
International Application No. PCT/IB2015/000702, International Search Report & Written Opinion, 14 pages, dated Aug. 25, 2015.
International Application No. PCT/IB2015/000714, International Search Report & Written Opinion, 10 pages, dated Aug. 31, 2015.
International Application No. PCT/IB2015/001694, International Search Report & Written Opinion, 14 pages, dated Dec. 23, 2015.

* cited by examiner

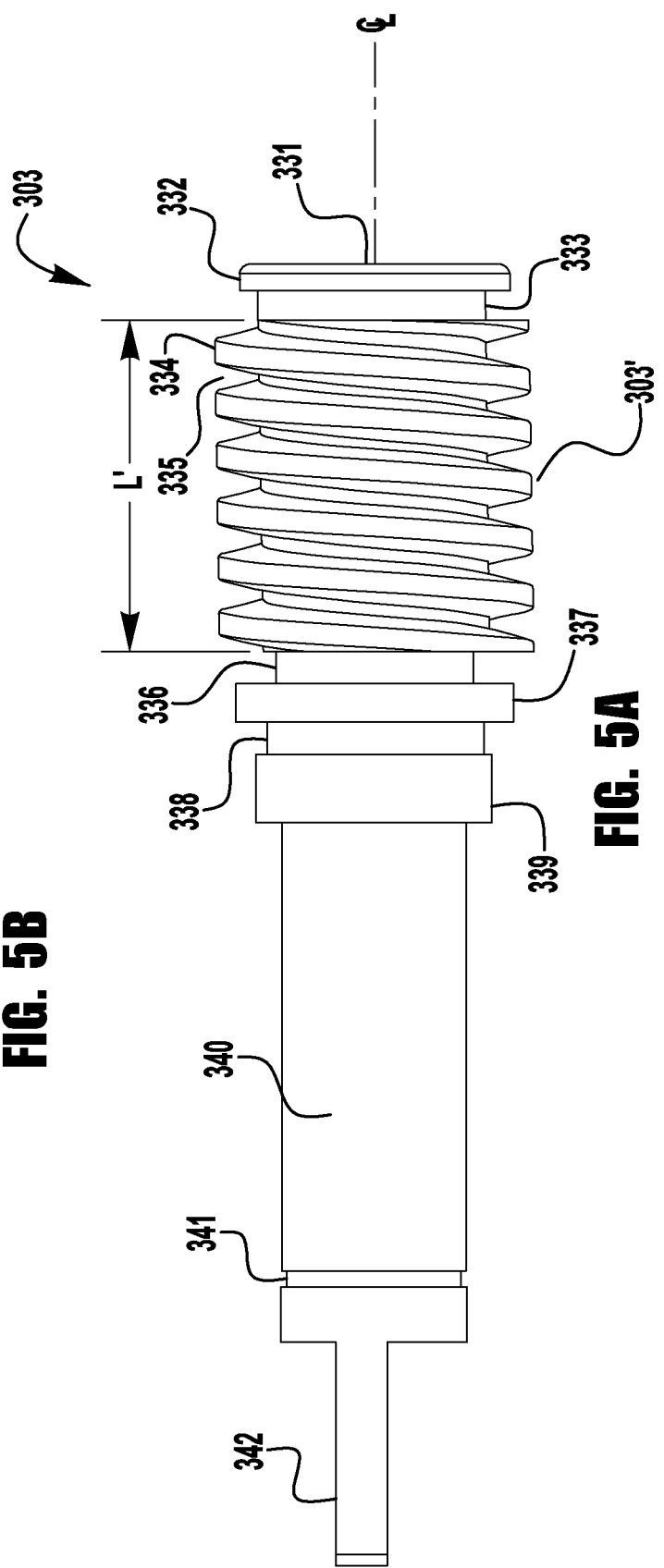

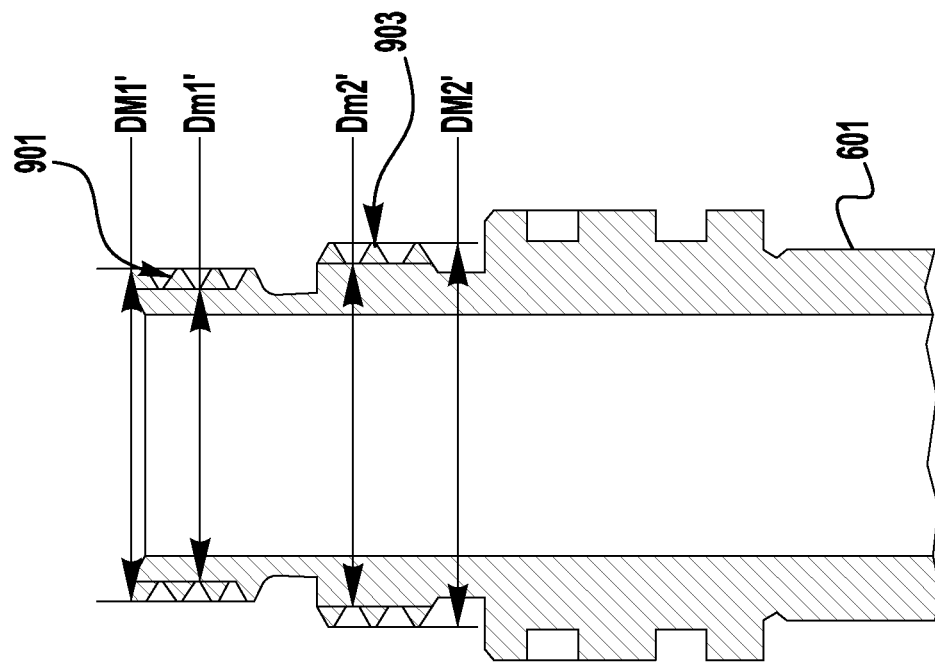
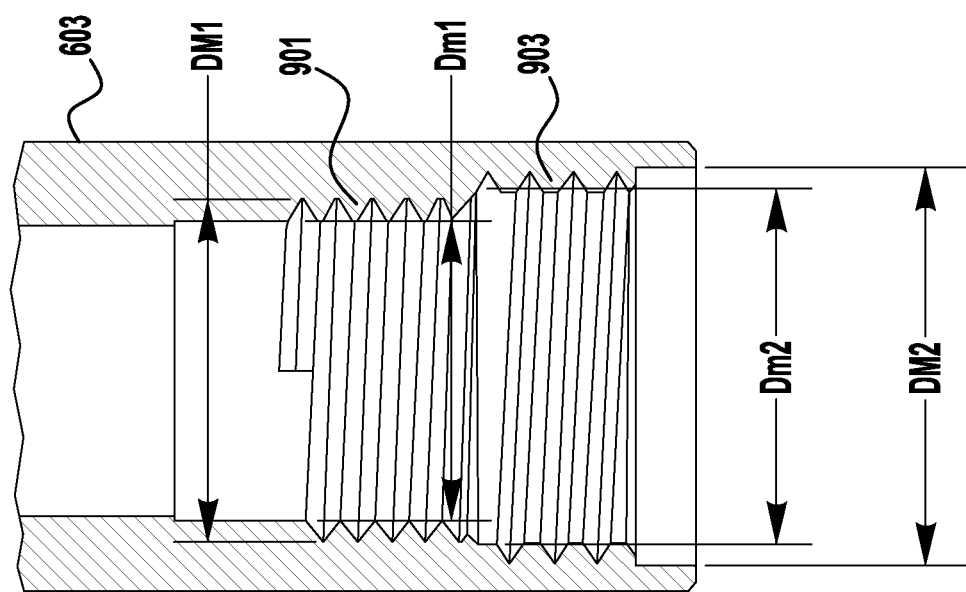

PLASMA TORCH AND COMPONENTS THEREOF

PRIORITY

The present application is a division of U.S. patent application Ser. No. 15/236,360 filed on Aug. 12, 2016, which claims priority to U.S. Provisional Patent Application Ser. No. 62/211,293 filed on Aug. 28, 2015 and U.S. Provisional Patent Application Ser. No. 62/241,077 filed on Oct. 13, 2015, the entire disclosures of which are fully incorporated herein by reference.

TECHNICAL FIELD

Devices, systems, and methods consistent with the invention relate to cutting, and more specifically to devices, systems and methods related to plasma arc cutting torches and components thereof.

BACKGROUND

In many cutting, spraying and welding operations, plasma arc torches are utilized. With these torches a plasma gas jet is emitted into the ambient atmosphere at a high temperature. The jets are emitted from a nozzle and as they leave the nozzle the jets are highly under-expanded and very focused. However, because of the high temperatures associated with the ionized plasma jet many of the components of the torch are susceptible to failure. This failure can significantly interfere with the operation of the torch and prevent proper arc ignition at the start of a cutting operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is plasma torch and components thereof that are designed to optimize performance and durability of the torch. Specifically, exemplary embodiments of the present invention can have an improved electrode and cathode configuration.

BRIEF DESCRIPTION OF THE DRAWINGS

The above and/or other aspects of the invention will be more apparent by describing in detail exemplary embodiments of the invention with reference to the accompanying drawings, in which:

FIGS. 5A and 5B are diagrammatical representations of an exemplary embodiment of a cathode of the present invention;

FIGS. 10A through 10C are a diagrammatical representation of an alternative exemplary connection method between an exemplary cathode and electrode of the present invention.

DETAILED DESCRIPTION

Figure 1:
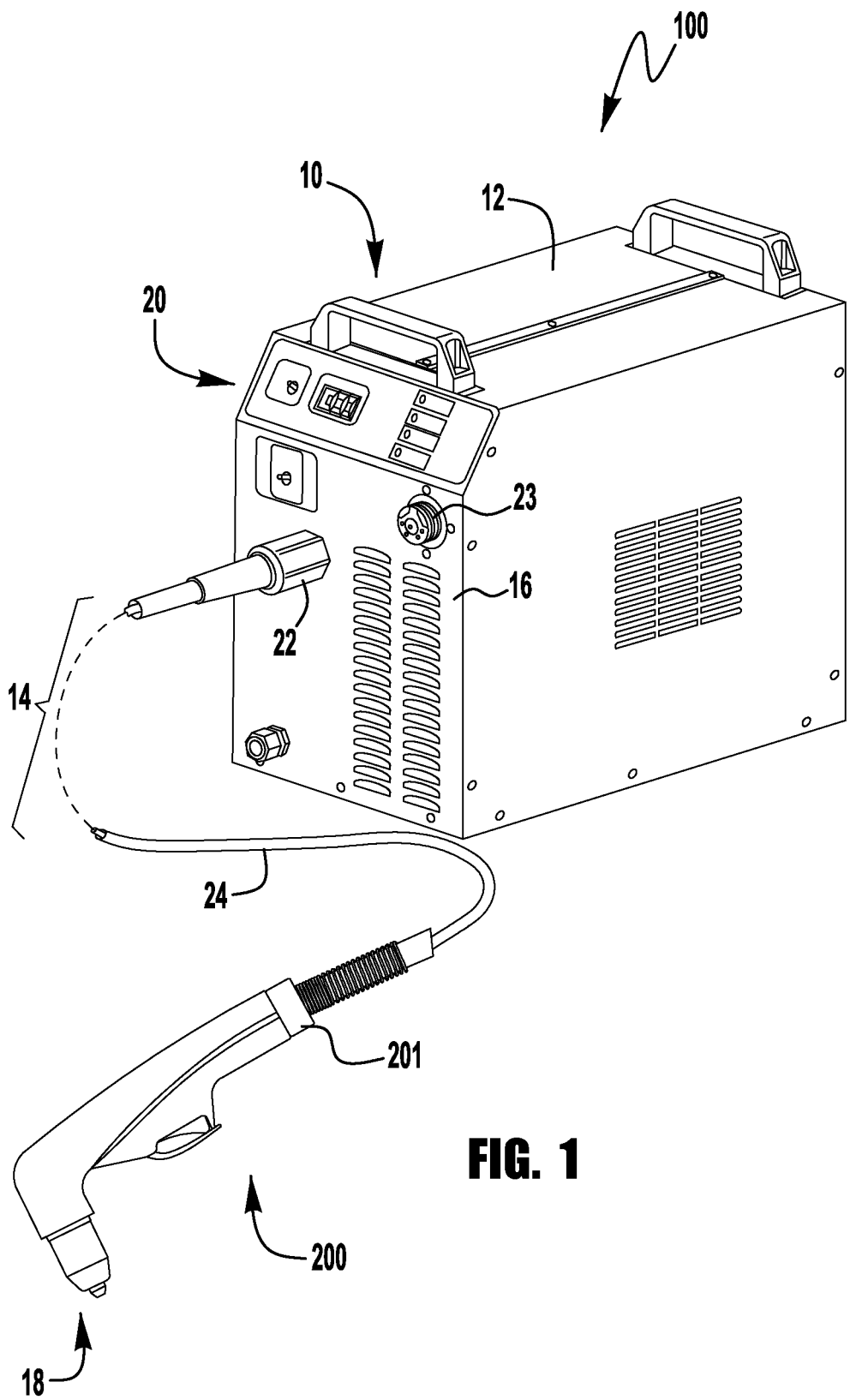
FIG. 1 is a diagrammatical representation of an exemplary cutting system which can be used with embodiments of the present invention.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to plasma arc torches useful various cutting, welding and spraying operations. Specifically, embodiments of the present invention are directed to air cooled plasma arc torches, while others are directed to liquid cooled embodiments. Of course, some of the features described herein can be used in either torch configurations without detracting from the novelty of the exemplary embodiments. Further exemplary embodiments are directed to air cooled plasma arc torches which are retract arc torches. As generally understood, retract arc torches are torches where the electrode is in contact with the nozzle for arc initiation and then the electrode is retracted from the nozzle so that the arc is then directed through a throat of the nozzle. In other types of retract torches, the electrode stays stationary and the nozzle is moved. Exemplary embodiments of the present invention can apply to both types. The construction and operation of these torches, as well as liquid cooled torches, are generally known, and thus their detailed construction and operation will not be discussed herein. Further, embodiments of the present invention can be used in either handheld or mechanized plasma cutting operations. It should be noted that for purposes of brevity of clarity, the following discussion will be directed to exemplary embodiments of the present invention which are primarily directed to a hand held plasma torch for cutting. However, embodiments of the present invention are not limited in this regard and embodiments of the present invention can be used in welding and spraying torches without departing from the spirit or scope of the present invention. Various types and sizes of torches are possible at varying power levels if desired. For example, exemplary embodiments of the present invention can be used on cutting operation that utilize a cutting current in the range of 40 to 100 amps, and can cut workpieces having a thickness of up to 0.075 inches, and in other embodiments can cut workpieces of a thickness of up to 1.5 inches. Further, the torches and components described herein could be used for marking, cutting or metal removal. Additionally, exemplary embodiments of the present invention, can be used with varying currents and varying power levels. The construction and utilization of air coolant systems of the type that can be used with embodiments of the present invention are known and need not be discussed in detail herein.

Turning now to FIG. 1, an exemplary cutting system 100 is shown. The system 100 contains a power supply 10 which includes a housing 12 with a connected torch assembly 14. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 14 is attached to a front side 16 of housing. Torch assembly 14 includes within it electrical connectors to connect an electrode and a nozzle within the torch end 18 to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 14 includes a connector 22 at one end for attaching to a mating connector 23 of housing 12. When connected in such way, the various electrical and gas passageways through the hose portion 24 of torch assembly 14 are connected so as to place the relevant portions of torch 200 in connection with the relevant portions within housing 12. The torch 200 shown in FIG. 1 has a connector 201 and is of the handheld type, but as explained above the torch 200 can be of the mechanized type. The general construction of the torch 200, such as the handle, trigger, etc. can be similar to that of known torch constructions, and need not be described in detail herein. However, within the torch end 18 are the components of the torch 200 that facilitate the generation and maintenance of the arc for cutting purposes, and some of these components will be discussed in more detail below. Specifically, the some of the components discussed below, include the torch electrode, nozzle, shield and swirl ring.

Figure 2:
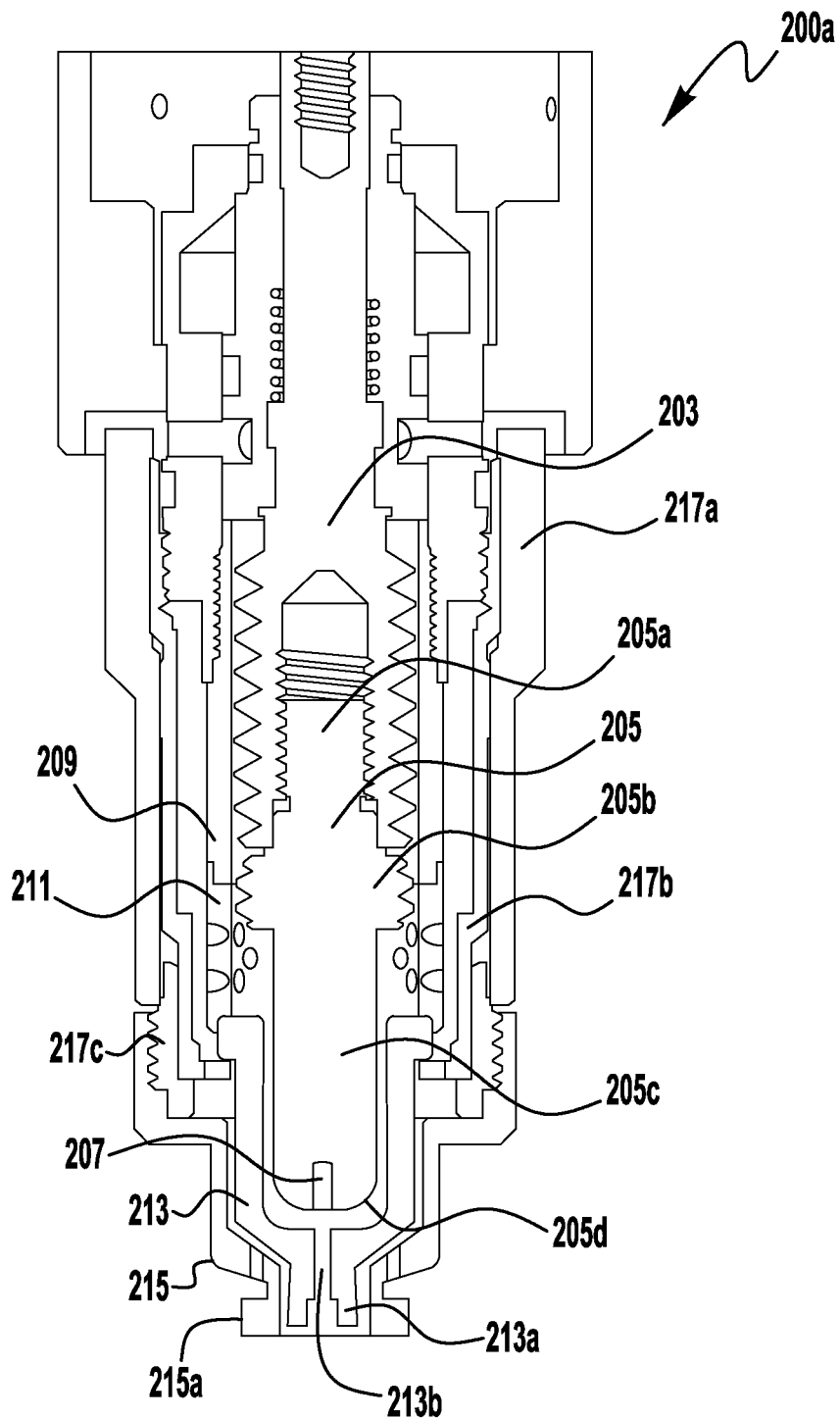
FIG. 2 is a diagrammatical representation of a portion of the head of a torch utilizing known components.

FIG. 2 depicts the cross-section of an exemplary torch head 200a of a known construction. It should be noted that some of the components of the torch head 200a are not shown for clarity. As shown, the torch 200a contains a cathode body 203 to which an electrode 205 is electrically coupled. The electrode 205 is inserted into an inside cavity of a nozzle 213, where the nozzle 213 is seated into a swirl ring 211 which is coupled to an isolator structure 209 which isolates the swirl ring, nozzle etc. from the cathode body 203. The nozzle 213 is held in place by the retaining cap assembly 217a-c. As explained previously, this construction is generally known.

As shown, the electrode 205 has a thread portion 205a which threads the electrode 205 into the cathode body 203.

The electrode 205 also has a center helical portion 205b. The helical portion 205b has a helical coarse thread-like pattern which provides for flow of the air around the section 205b. However, because of this section special tooling is required to remove the electrode 205 from the cathode body 203. Downstream of the center portion 205b is a cylindrical portion 205c, which extends to the distal end 205d of the electrode 205. As shown, the cylindrical portion is inserted into the nozzle 213, such that the distal end 205d is close to the throat 213b of the nozzle 213. The cylindrical portion can include a flat surface at the center portion 205b so that a specialized tool can grab the electrode 205 to remove it from the cathode. Typically, the transition from the cylindrical portion 205c to the distal end 205d includes a curved edge leading a flat end face on the distal end 205d. In a retract start torch this flat end face is in contact with the inner surface of the nozzle 213 to initiate the arc start. Once the arc is ignited the electrode 205 is retracted and a gap is created between the electrode 205 and the nozzle 213 (as shown), at which time the plasma jet is directed through the throat 213b of the nozzle 213 to the workpiece. It is generally understood, that with this configuration, known electrodes 205 can begin to fail during arc initiation after about 300 arc starts. Typically, the electrode 205 is chrome or nickel plated to aid in increasing the life of the electrode 205. Once this event begins to occur, the electrode 205 may need to be replaced.

Also, as shown a hafnium insert 207 is inserted into the distal end 205d of the electrode 205. It is generally known that the plasma jet/arc initiates from this hafnium insert 207, which is centered on the flat surface of the distal end 205d.

As briefly explained above, the torch 200a also includes a nozzle 213 which has a throat 213b threw which the plasma jet is directed during cutting. Also, as shown the nozzle 213 contains a cylindrical projection portion 213a through which the throat 213b extends. This projection portion 213a provides for a relatively long throat 213b and extends into an cylindrical opening in the shield 215, which also has a cylindrical projection portion 215a. As shown, and air flow gap is created between each of the projection portions 213a/215a to allow a shielding gas to be directed to encircled the plasma jet during cutting. In air cooled torches, each of these respective projection portions 213a/215a direct the plasma jet and shield gas to the getting operation. However, because of the geometry of each of the nozzle 213 and the shield cap 215, these projection portions can tend to heat up significantly. This heat can cause the heat band on the nozzle 213 to extend significantly along its length. This increased heat band and high heat can cause the components to deteriorate and fail, causing the need for replacement. Further, their performance can degrade over time which can cause less than optimal cutting results. Therefore, improvements are needed for known air cooled torch configurations.

Figure 3A:
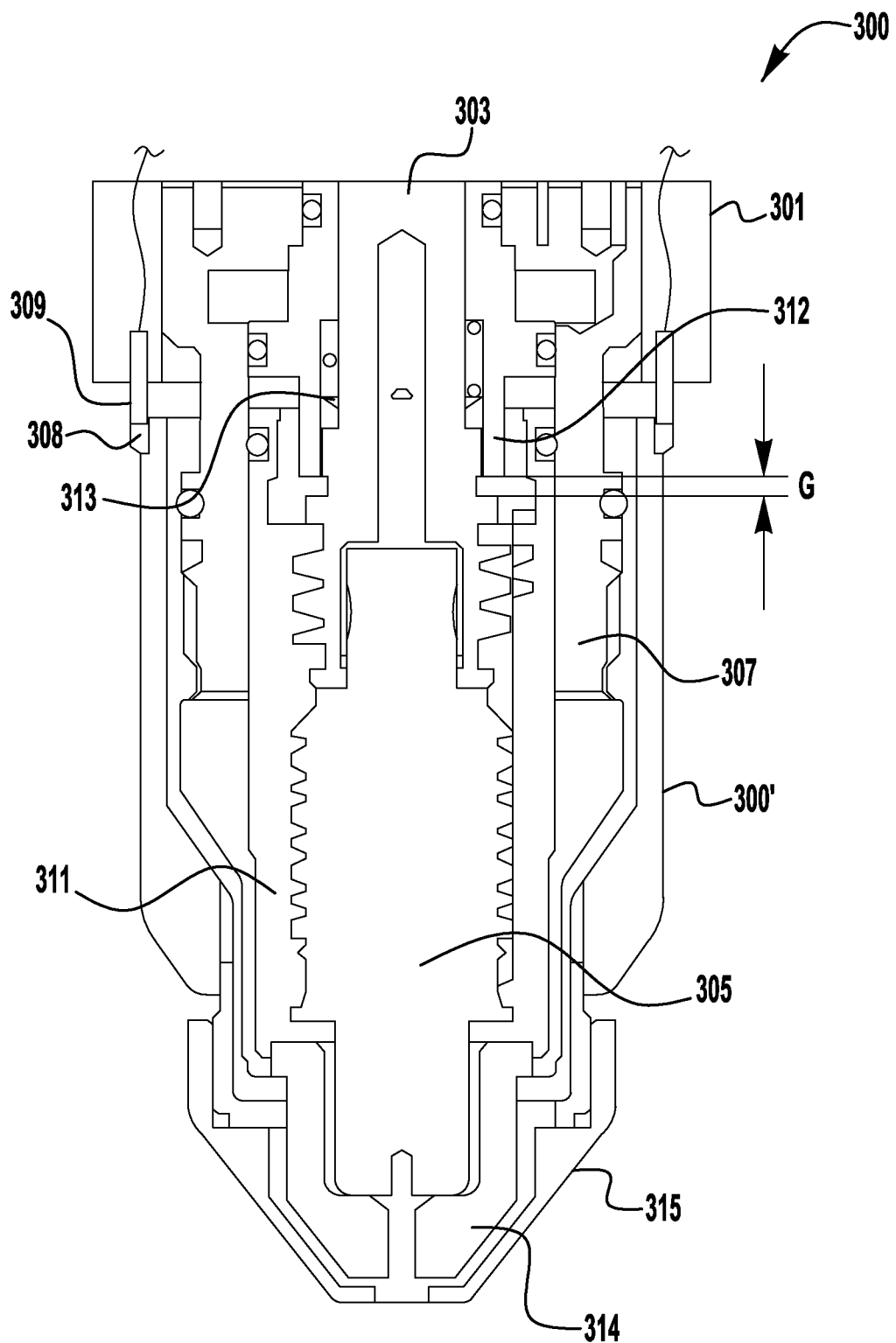
FIGS. 3A and 3B are diagrammatical representations of a portion of the head of an exemplary embodiment of an air cooled torch of the present invention.
Figure 3B:
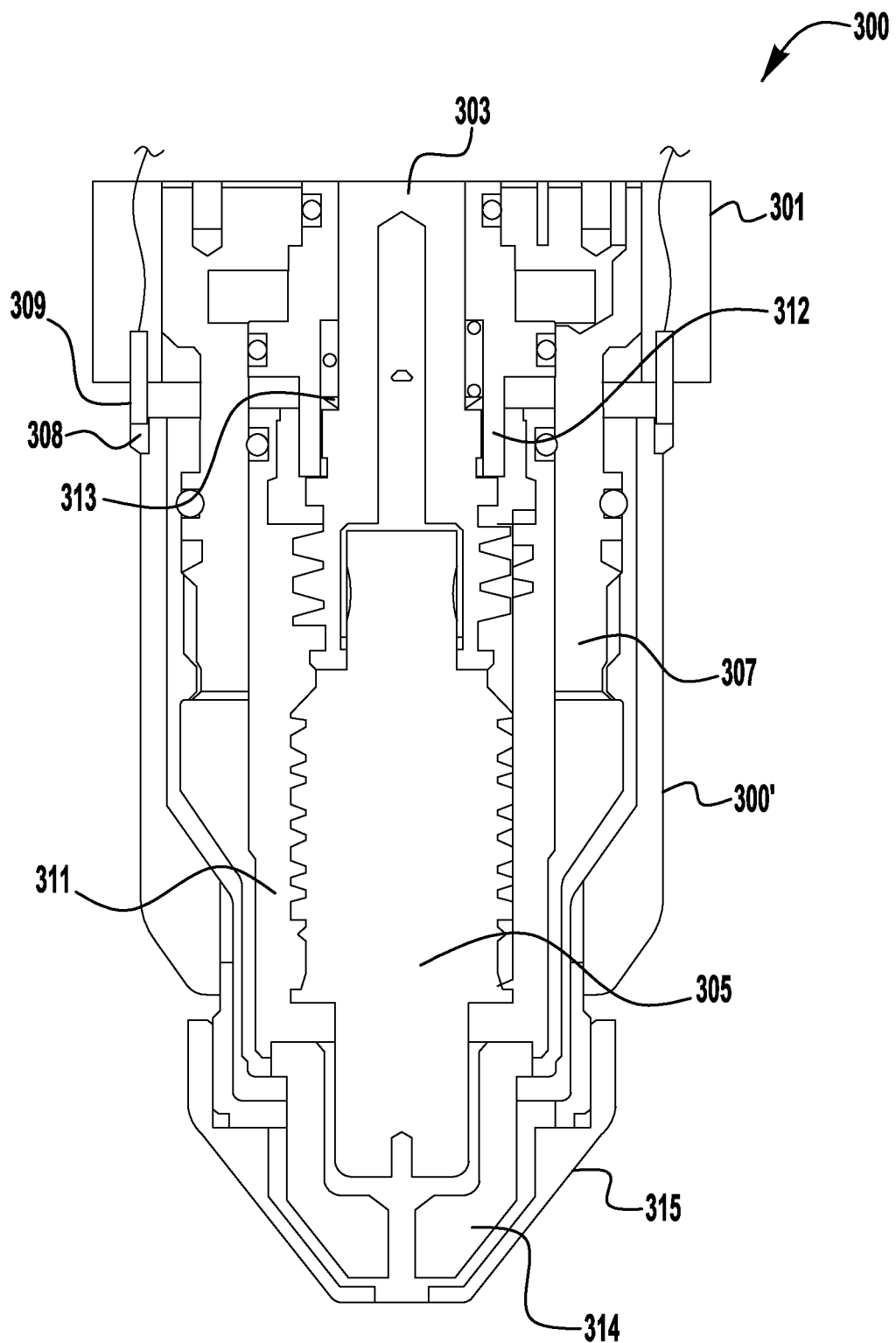

Turning now to FIGS. 3A and 3B, an exemplary embodiment of a torch 300 is shown. The torch 300 can be used in the torch 200 shown in FIG. 1, and like FIG. 2, not all of the components and structure is shown to simplify the Figure (for example, handle, outer casing, etc.). Further, in many respects (except those discussed below) the construction and operation of the torch 300 is similar to known torches, such that all of the details of its construction need not be discussed herein. However, as will be explained in more detail below, some of the components of the torch 300 are constructed differently than known torches and torch components and provide for a cutting torch with optimized cutting performance and durability. Further, like the torch 200a in FIG. 2, the torch 300 in FIG. 3 is an air cooled, retract-type torch. Further understanding of exemplary embodiments of the present invention is provided in the discussions below, in which some of the components are discussed.

As shown in each of FIGS. 3A and 3B, the torch 300 has a torch body 301 and a torch head 300'. This is a known construction methodology, where the torch head 300' can be secured to the torch body 301 via a connection mechanism. As shown, the torch body has a parts in place switching mechanism 309 which makes contact with a brass ring 308. This connection completes an electrical circuit which then indicates to the system 100 that the torch head 300' is properly secured to the torch body 301. In other exemplary embodiments the parts-in-place sensing can be done by a sealed switch actuated by a plunger, or other similar switch construction which indicates that the components are properly secured to each other. Like the torch shown in FIG. 2, the torch head 300' includes an electrode 305, swirl ring 311, shield cap 315, anode 307, cathode 303, nozzle 314 and an isolator 312. Also included is a bias member 313, such as a spring. FIG. 3A depicts the torch in an arc ignition/pilot arc mode where the distal tip of the electrode 305 is in contact with the nozzle 314. The bias member 313 holds the electrode 305 and cathode 303 (to which the electrode is coupled) in this position creating the gap G between the isolator 312 and the cathode 303 as shown. This contact between the nozzle 314 and the electrode 305 allows an arc to be ignited when current is first applied to the torch 300. At the same time a gas pressure is provided to the torch which causes the electrode/cathode to retract away from the nozzle 314. This position is shown in FIG. 3B which shows the gap G reduced to allow contact between the cathode 303 and the isolator 312, as the bias member 313 is compressed. Also a gap is created between the electrode tip and the nozzle 314 such that the created arc is transferred to the work piece to allow the cutting to begin. This movement of the electrode/cathode is triggered by the influx of a gas/air pressure which pushes the electrode/cathode assembly against the bias member 313. In addition to providing the pressure to electrode/cathode the gas/air flow also aids in cooling the components as it passes over the surfaces of these components. To aid in the cooling, channels/grooves are placed on the outer surface of the electrode/cathode. However, as the cooling gas/air passes over the surface of these components it can impart undesired forces on the components because of the grooves. For example, the flow can be directed such that it imparts an undesired torsional force on the electrode/cathode. Further, the flow can be directed such that it imparts uneven forces on the components. These torsional/uneven forces can compromise the operation efficiencies of torches and adversely affect cutting operations and/or decrease the operation life of components. As discussed below, embodiments of the present invention address these concerns.

Figures 4A, 4B:
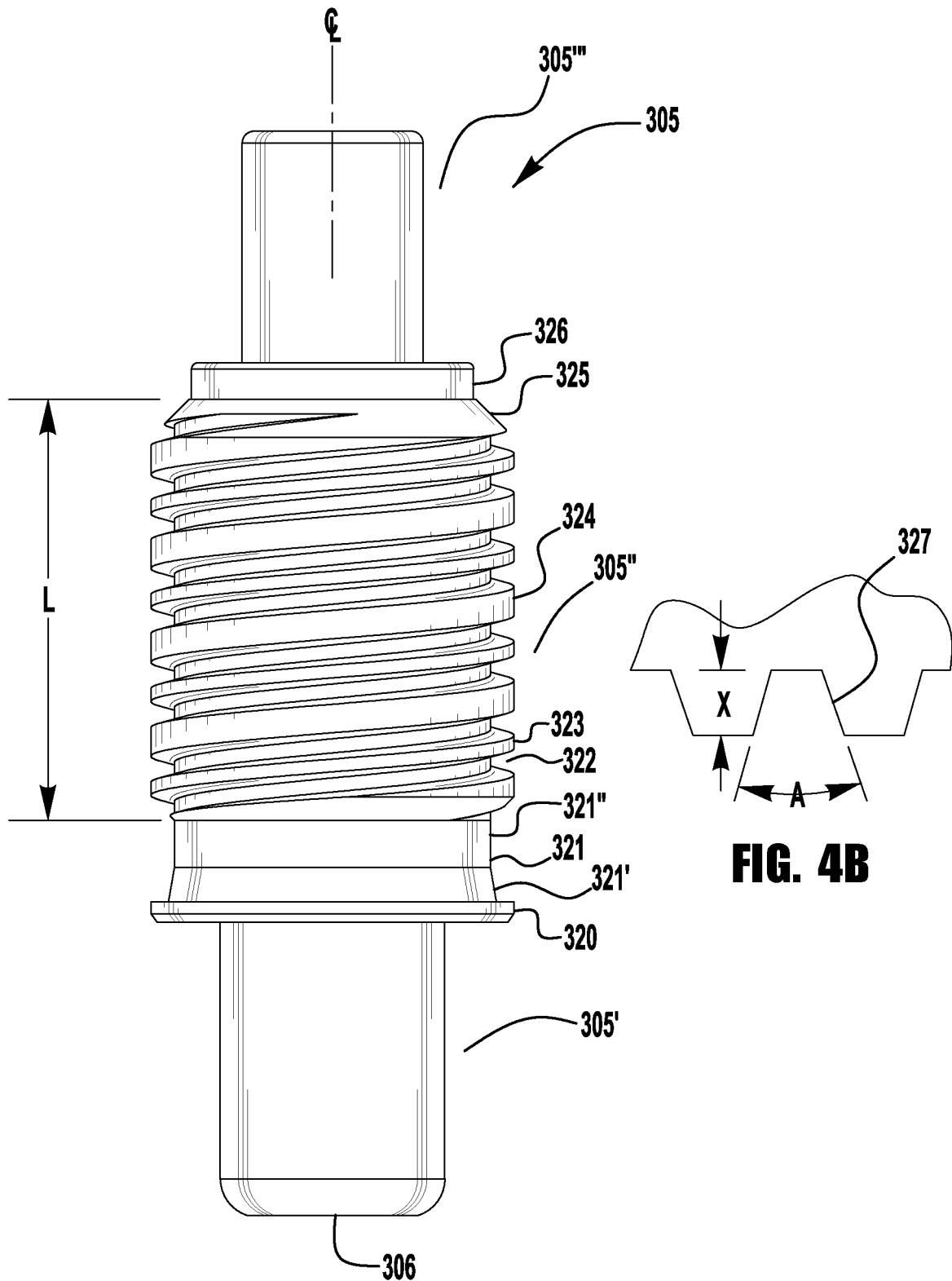
FIGS. 4A and 4B are diagrammatical representations of an exemplary embodiment of an electrode of the present invention.

FIGS. 4A and 4B depict an exemplary embodiment of the electrode 305 used in the torch 305. The electrode 305 has a distal end 305' which is inserted into the nozzle and at the end face of which a hafnium insert 306 is inserted—from which the arc originates. Of course, another material can be used besides hafnium. In exemplary embodiments, the electrode 305 can be made from copper or a copper alloy, or other suitable materials. Upstream of the distal end 305' is a shoulder portion 320 which has a maximum outer diameter which is in the range of 55 to 65% larger in diameter than the maximum outer diameter of the distal end portion 305'. In some exemplary embodiments, the shoulder portion 320 has the maximum outer diameter of the entire electrode 305. Upstream of the shoulder portion 320 is a transition portion 321 having an angled surface 321' (which angles toward the centerline of the electrode 305 as it travels upstream) and a non-angled surface 321'' which is parallel to the centerline of the electrode 305. Upstream of the transition portion 321 is a central groove portion 305''. In exemplary embodiments, the central groove portion 305'' has a two-thread feature, where the threads are in the range of 130 to 180 degrees apart. In an exemplary embodiment, the threads are 150 degrees apart. As shown, the threads have grooves 322 and crests 323 and 324. In the exemplary embodiment shown, a first crest 323 has a first crest width and a second crest 324 has a second crest width which is wider than the first crest width. In exemplary embodiments, the second crest width is in the range of 1.5 to 3 times the width of the first crest width. In other exemplary embodiments, the second crest width is in the range of 2 to 2.5 times the first crest width. Further, in additional exemplary embodiments, the maximum outer diameter of the groove portion 305'' is the same as the maximum outer diameter of the shoulder portion 320. As shown, in exemplary embodiments, the first and second crests alternate which respect to each other such that no two first or second crests are adjacent to each other. Further, as shown in FIG. 4B, the grooves 322 are configured such that the groove surfaces 327 are angled to create an angle A between adjacent groove surfaces 327. In exemplary embodiments, the angle A is in the range of 20 to 40 degrees. In other exemplary embodiments, the angle A is in the range of 26 to 32 degrees. In exemplary embodiments, the grooves 322 have a depth X (from the crests to the roots) which is in the range of 4 to 10% of the maximum outer diameter of the groove portion 305''. Further, in exemplary embodiments, the grooves are configured such that they are in the range of 4 to 8 TPI (turns per inch). In other exemplary embodiments, the electrode grooves have 5 to 7 TPI, and yet in further embodiments, the grooves have 6 TPI. The grooves can be configured as a right hand thread or a left hand thread.

Upstream of the groove portion 305'' is an angled transition portion 325, followed by a shoulder portion 326 and an upstream end portion 305'''. At least a portion of the upstream end portion is inserted into an electrode cavity of the cathode 303, as shown in FIGS. 3A and 3B. The angled portion 325 is angled relative to the centerline CL such that the surface angle is in the range of 40 to 50 degrees relative to the centerline. In other exemplary embodiments, surface of the angled surface 325 is 45 degrees relative to the centerline CL. In exemplary embodiments, the upstream end portion 305''' has a maximum outer diameter which is smaller than the maximum outer diameter of the distal end portion 305'.

In exemplary embodiments, this electrode/groove configuration can provide optimal air/gas flow for cooling and to provide the desired upward pressure forces to ensure proper operation of the torch 300. However, because of the spiral nature of the grooves as shown, as described above, a torsional force can be imparted on the electrode 305, trying to turn the electrode 305 relative to its centerline CL. This torsional force is counteracted by the configuration of the cathode described below. Of course, it should be noted that the overall appearance, geometrical shape, etc. of the electrode can be changed to fit the desired torch configuration and have the desired appearance without departing from the spirit or scope of the embodiments of the invention described above, and the views shown in the figures described herein are intended to show one exemplary embodiment.

FIGS. 5A and 5B depict an exemplary embodiment of the cathode 303 shown in FIGS. 3A and 3B. The cathode 303 has a distal end 331 into which a cavity is created (shown in FIGS. 3A/3B) to allow for the insertion of the upstream end 305''' of the electrode 305. The cavity is configured such that a contact fit is made between the electrode 305 and the cathode cavity. Adjacent to the distal end face 331 is a shoulder portion 332 and a separator portion 333. The separator portion separates the shoulder portion 332 from the groove portion 303'. As shown, the groove portion 303' has a spiral groove 335 extending along its length. In exemplary embodiments, the spiral groove 335 is different than the grooves on the electrode. For example, in exemplary embodiments, the groove 335 is a single groove, unlike the double groove/thread feature of the electrode 305. Further, as shown, in exemplary embodiments, the maximum outer diameter of the groove crests 334 is the maximum outer diameter of the cathode 303. However, in some embodiments, the maximum outer diameter of the cathode—at the crests 334—is less than the maximum outer diameter of the electrode 305. Additionally, in exemplary embodiments, the groove 335 creates crests 334 which do not alternate in size—that is the width of the crest 334 is consistent throughout the groove portion 303'. Additionally, while the groove 335 can be either a left or right hand groove, the spiraling should be opposite of that of the electrode groove(s). For example, if the electrode groove(s) is a right hand thread, the groove 335 of the cathode should be a left hand thread. This ensures that the torsional forces from the air/gas flow along the electrode are counteracted by the subsequent flow along the cathode 303. By changing thread directions, the air/gas flow provides structural stabilization that would not otherwise be achieved. Further, the groove 335 of the cathode 303 is to have a different TPI than that of the groove(s) used on the electrode. For example, in exemplary embodiments, the groove 335 of the cathode 303 has a higher thread count than that of the electrode. In exemplary embodiments, the groove 334 has a thread count in the range of 7 to 12 TPI, and is higher than that of the electrode. In further exemplary embodiments, the thread count is in the range of 8 to 10 TPI. In even further exemplary embodiments, the thread count of the cathode is at least 3 TPI higher than that of the thread count on the electrode 305. For example, Of course, in other exemplary embodiments, the thread count of the electrode groove(s) is 6 TPI the thread count of the groove 335 is at least 9 TPI.

Upstream of the groove 335 is a collar portion 336 which couples the groove portion to a shoulder portion 337. In an exemplary embodiment, the collar portion 336 has a smaller outside maximum diameter which is smaller than the outside diameter of the separator portion 333. The shoulder portion 337 has a maximum outside diameter, which in some embodiments is the same as the outside diameter of the shoulder portion 332. Upstream of the shoulder portion 337 is another collar portion 338 which couples the shoulder portion 337 to an additional shoulder portion 339. In exemplary embodiments, the collar portion 338 has a maximum outer diameter that is larger than the outer diameter of the portion 336. Upstream of the shoulder portion 339 is a cylindrical portion 340 which has a maximum outside diameter. In exemplary embodiments, the outside diameter of the cylindrical portion 340 is smaller than the outside diameters of each of the collar portions 338, 336 and separator portion 333. Upstream of the cylindrical portion is a groove 341 and an extension portion 342.

FIG. 5B shows a cross-section of the groove 335, similar to that in FIG. 4B. As shown, the groove surfaces 343 are angled such that an angle B is formed between them. In exemplary embodiments, the angle B is in the range of 20 to 40 degrees. In other exemplary embodiments, the angle B is in the range of 26 to 32 degrees. In further embodiments, the angle B is the same as the angle A on the electrode. In exemplary embodiments, the grooves 335 have a depth Y (from the crests to the roots) which is in the range of 6 to 12% of the maximum outer diameter of the groove portion 303'. In further exemplary embodiments, the groove 335 has a depth Y which is greater than the depth X of the groove(s) on the electrode 305. For example, in exemplary embodiments, the groove depth Y is in the range of 15 to 30% larger than the depth X. In additional exemplary embodiments, the depth Y is in the range of 20 to 25% larger than the depth X.

With the above described relationships between the spiral grooves on each of the electrode 305 and the cathode 303 the utilization of the air flow along the electrode 305 and cathode 303 is optimized, while avoiding imparting unnecessary forces on the components. Specifically, the flow channels are changed such that the flow does not maintain a smooth laminar flow, but has to change directions between the components and its flow is different along each components because of the dimensional differences. Further, in exemplary embodiments because of the varying respective lengths of the groove portions of each respective component the differing dimensional relationships allow the torsional forces on each respective component to balance out, or come close to balancing out, while at the same time allowing for optimal pressure performance of the air/gas flow to move the electrode/cathode assembly as needed to transition from arc strike to arc transition/cutting. For example, the overall length L' of the spiral groove 335 (along the length of the cathode) is in the range of 20 to 35% of the overall length of the cathode 303 (from end to end). In further exemplary embodiments, the length L' is in the range of 25 to 30% of the overall length. However, on the electrode 305 the length L of the spiral grooves (along the axis of the electrode) is in the range of 30 to 40% of the overall length of the electrode 305. In other exemplary embodiments, the length L is in the range of 35 to 40% of the overall length of the electrode 305. In some exemplary embodiments the lengths L and L' are the same, while in other exemplary embodiments, the length L is longer than L'.

With the above electrode 305 and cathode 303 physical relationships and described attributes, exemplary embodiments of the present invention allow for an air cooled, retract type torch to have an optimized performance.

Figure 6:
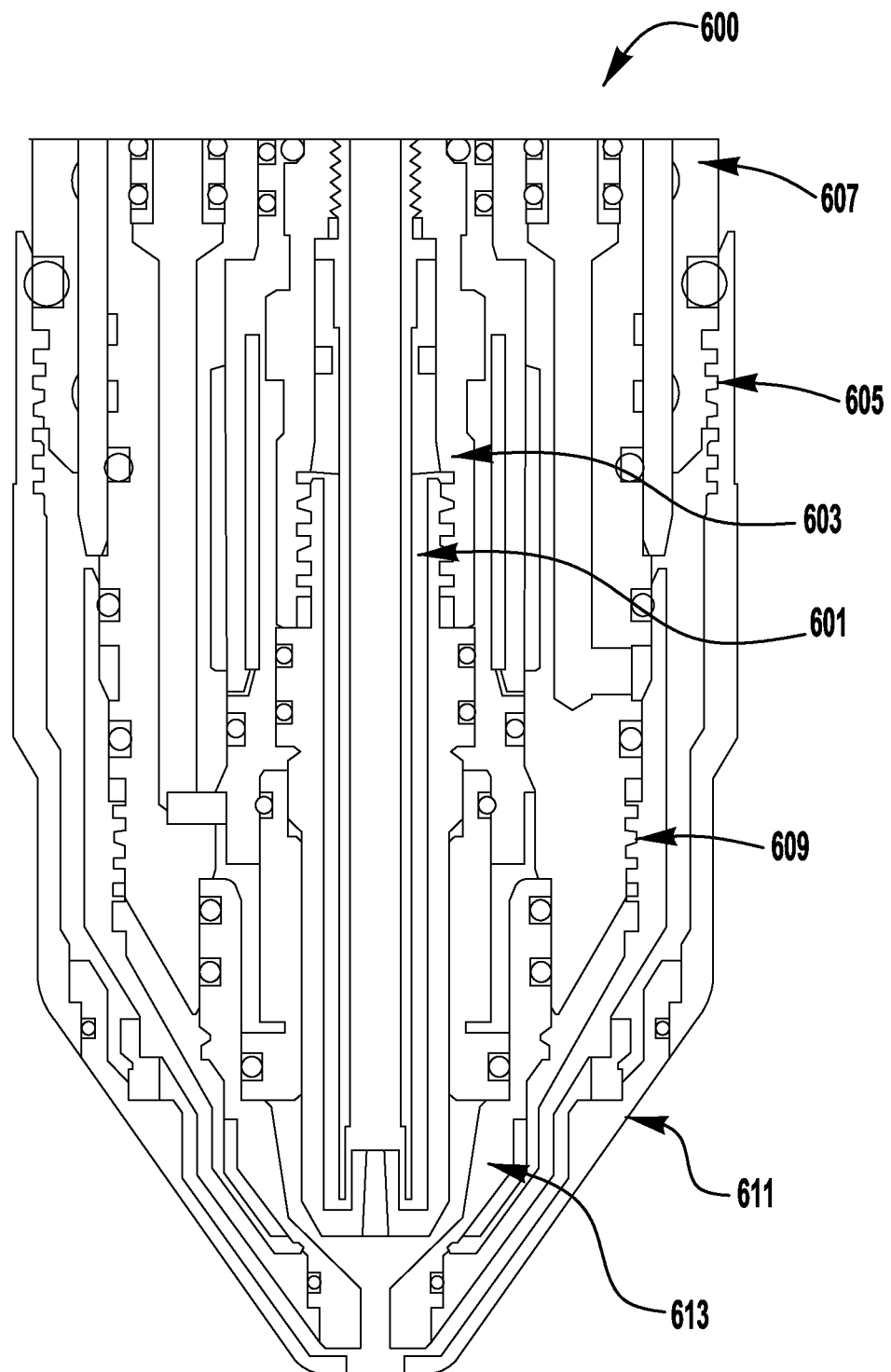
FIG. 6 is a diagrammatical representation of an exemplary embodiment of a liquid cooled torch of the present invention.

Turning now to FIG. 6, an exemplary embodiment of a liquid cooled torch 600 is depicted. In general, the torch 600 is constructed consistent with similar known liquid cooled torches. For example, the torch includes a nozzle 613, shield cap 611, nozzle retaining cap 609, electrode 601, cathode 603, outer cap 605 and outer casing 607. Of course, the torch 600 includes other components that need not be discussed herein. However, as shown in FIG. 6, and further discussed below, the threaded connections between components use a novel thread configuration, which is discussed in more detail below.

The thread configuration utilized by embodiments herein is a modified stub ACME thread design. An ACME thread design is known by those of skill in the art and need not be described in detail herein, and its description can be found in the *Machinery's Handbook*; Oberg, Jones, and Horton, Industrial Press, Inc.; 1979, the ACME stub thread design section is incorporated herein by reference in its entirety.

Figure 7:
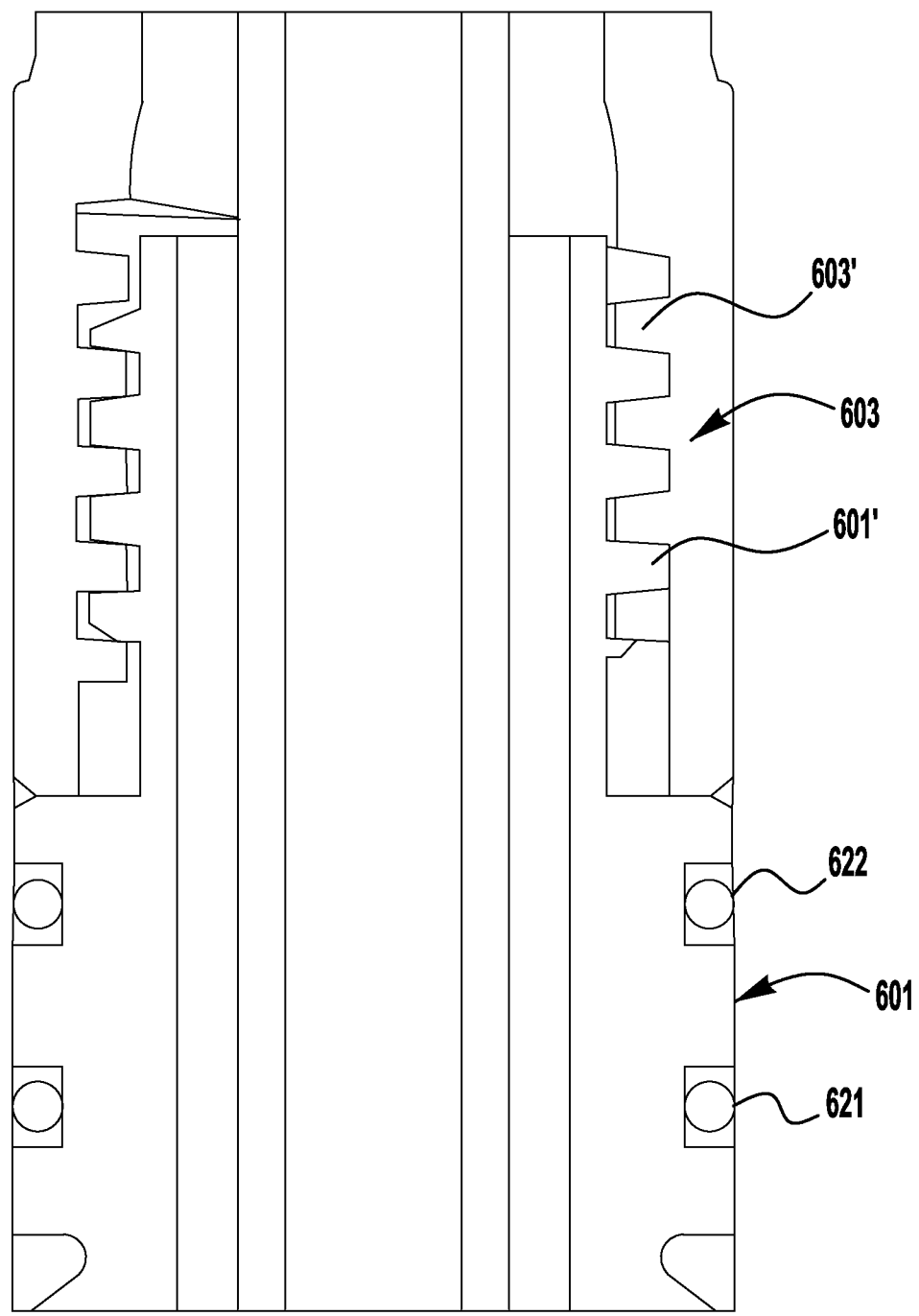
FIG. 7 is a diagrammatical representation of a magnified view of components of the torch of FIG. 6.
Figure 8:
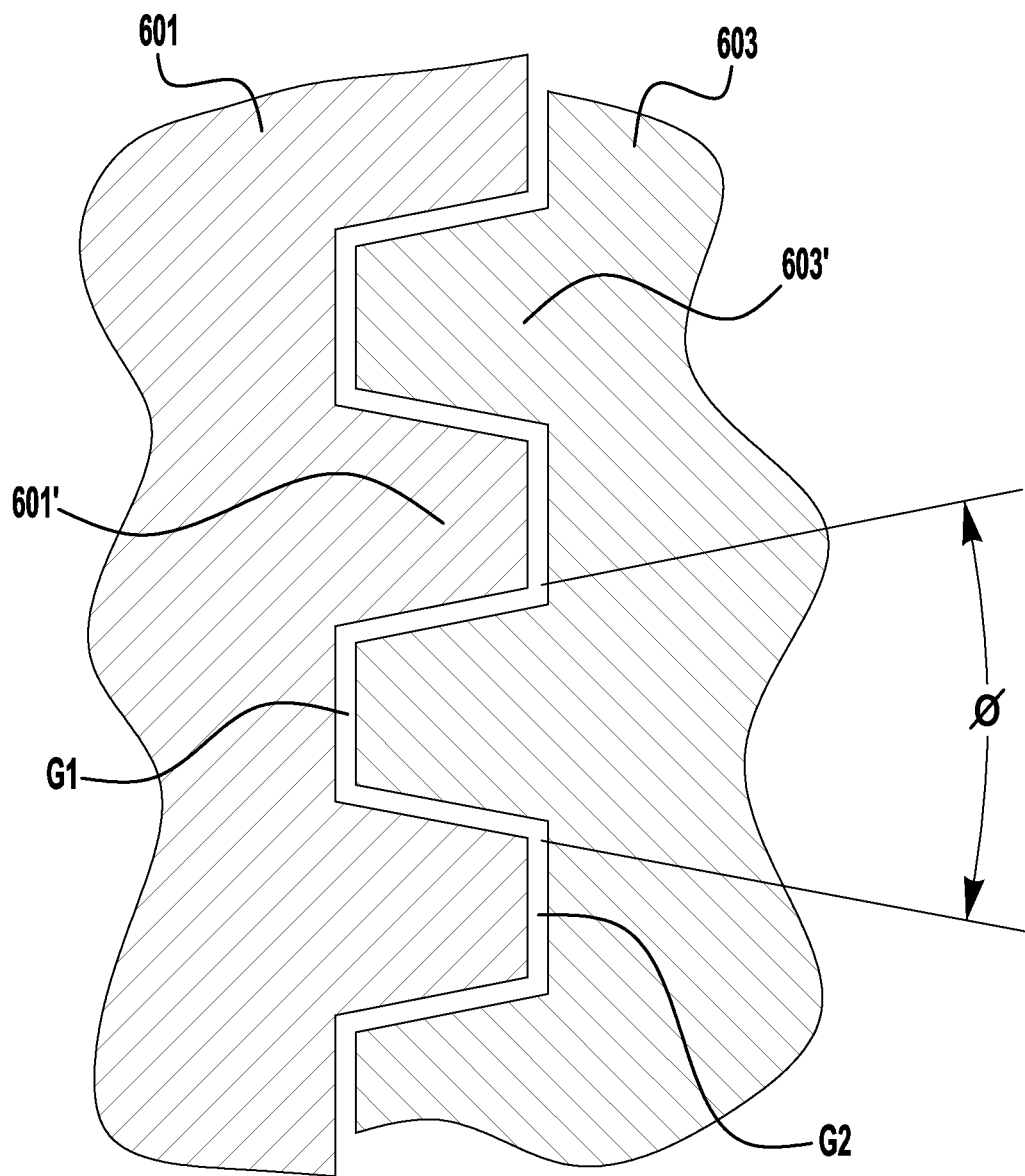
FIG. 8 is a diagrammatical representation of a thread connection that can be used with embodiments of the torch shown in FIG. 6.

A closer view of exemplary thread configurations is shown in FIGS. 7 and 8. As shown, a modified ACME stud thread configuration is used to join the electrode 601 to the cathode 603. It should be noted that while this thread configuration is discussed in reference to the electrode/cathode connection. This thread configuration can be used elsewhere as well—as shown in FIG. 6. For example, the nozzle retaining cap 609 and/or the outer cap 605 can use the described thread configurations to aid in providing an optimal connection. This modified ACME stud thread configuration is used by embodiments of the present invention to increase the concentricity of torch components when the torch is assembled. Because of the need for high levels of concentricity to ensure optimum torch performance and life, it is often very difficult to manufacture components with the needed high level of precision to ensure this concentricity. Therefore, there is a need for threaded connections which are easy to manufacture, provide a high level of concentricity when assembled and provide a large contact surface for electrical and thermal conductivity. Embodiments of the present accomplish this with the configurations discussed below.

Turning now to FIGS. 7 and 8, the cathode 603 has a female thread 603' while the electrode has a male thread 601'. In exemplary embodiments of the present invention, in each of the male and female threads the crest width of the threads is larger than the root width of the threads. This is not consistent with many known thread configurations. Further, in additional exemplary embodiments, the crest width, in each of the male and female threads, is in the range of 1 to 5% larger than that of the root width, in each of the respective male and female threads. In further exemplary embodiments, the crest width is 2 to 3.5% larger than that of the root width, and in additional exemplary embodiments, the crest width is in the range of 2.5% to 3.5 larger than that of the root width. Of course, these ratios are for a thread formation with a relatively small included angle—for example, a 10 degree included angle.

In exemplary embodiments, the included angle between the sidewalls of the threads φ is in the range of 10 to 60 degrees. However, in other exemplary embodiments, the included angle φ is 10 degrees. With such a steep angle the threads are practically square threads and can provide a high level of concentricity and strength.

Further, the threads are configured such that the gap G1 (which is the clearance between the minor diameter of the male thread 601' and the minor diameter of the female thread 603') is smaller than the gap G2 (which is the clearance between the major diameter of the male thread 601' and the major diameter of the female thread 603'). In exemplary embodiments, this clearance relationship with the above discussed configuration provides a thread configuration which is relatively easy to manufacture and easy to secure to each other (preventing cross-stripping) and also provides a high level of concentricity and contact between components.

In exemplary embodiments, the threads have a pitch such that they are in the range of 10 to 14 TPI. In further exemplary embodiments, the thread has a pitch of 12 TPI. It should be noted that due to geometrical and tooling limitations, the pitch used can affect the relationship between the crest and root sizes.

Figure 11B:
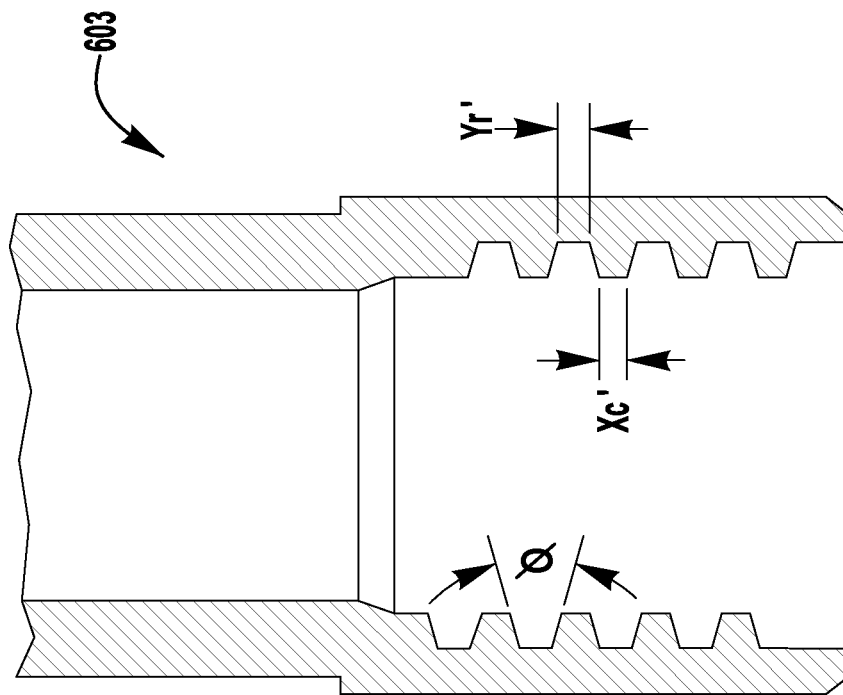
FIGS. 11A and 11B are a diagrammatical representation of a further exemplary embodiment of a thread connection between an electrode and cathode.
Figure 11A:
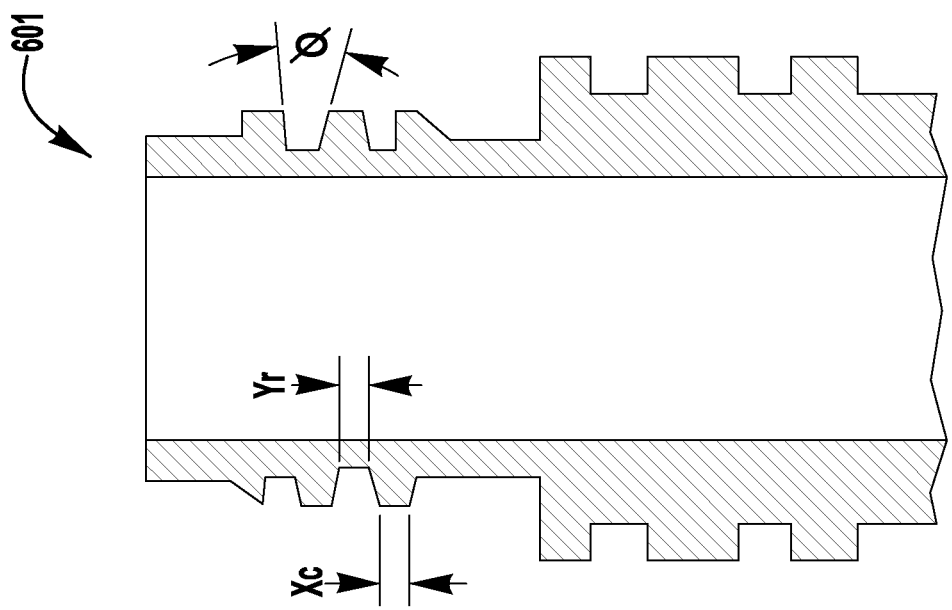

FIGS. 11A and 11B depict a further exemplary embodiment of the present invention, where a modified square thread pattern is used similar to that described above. However, in this exemplary embodiment the relationship between the roots and crests of the threads of the electrode and cathode have an opposite relationship. Specifically, in this exemplary embodiment the male threads of the electrode have a crest width Xc which is larger than the male thread root width Yr. In exemplary embodiments the included angle φ is 10 degrees, while in other embodiments the included angle can be different, such as in the range of 10 to 40 degrees. In exemplary embodiments, the ratio between the crest width Xc and root width Yr is in the range of 1.2 to 1.6. In further exemplary embodiments, the ratio is in the range of 1.35 to 1.45. However, with these exemplary embodiments, the female threads of the cathode 603 have a crest width Xc' which is smaller than the root width Yr'. This is the opposite of the size relationship on the electrode. In exemplary embodiments, for the cathode thread the ratio between the crest width Xc' and root width Yr' is in the range of 0.5 to 0.75. In further exemplary embodiments, the ratio is in the range of 0.65 to 0.7. Like the male thread, the included angle on the female threads of the cathode can be in the range of 10 to 40 degrees, while in some embodiments the included angle φ is 10 degrees. The thread count in exemplary embodiments can be in the range of 12 to 16 TPI, and in further exemplary embodiments the thread count is 12 TPI. Like the exemplary configurations discussed above, this exemplary configuration allows for improved alignment, physical and electrical connection between components, ease of installation between the components, and concentricity of components.

This concentricity improvement is enhanced through the use of the dual o-ring configuration as shown in FIGS. 6 and 7. As shown, two o-rings 621 and 622 are positioned downstream of the thread portion of the electrode 601. The use of two o-rings with the above thread configuration improves concentricity of the electrode 601. The above described thread configuration allows the o-rings 621/622 to provide an increased role in positioning the electrode over known configurations. That is, in known configurations, the threads were the primary driver in positioning the electrode 601. As such, if the threads were manufactured poorly and/or were stripped during installation the concentricity of the components would be adversely affected. However, in current exemplary embodiments, the threads allow the o-rings 621/622 to have an increased role in ensuring that the electrode is positioned centrally. This is due to the compressibility of the o-rings, which tend to compress evenly around the perimeter of the electrode 601. Thus, the above described configuration of the electrode, and its coupling allows the electrode 601 to be centralized in the torch and in the isolator—as shown in FIG. 6.

Figure 9:
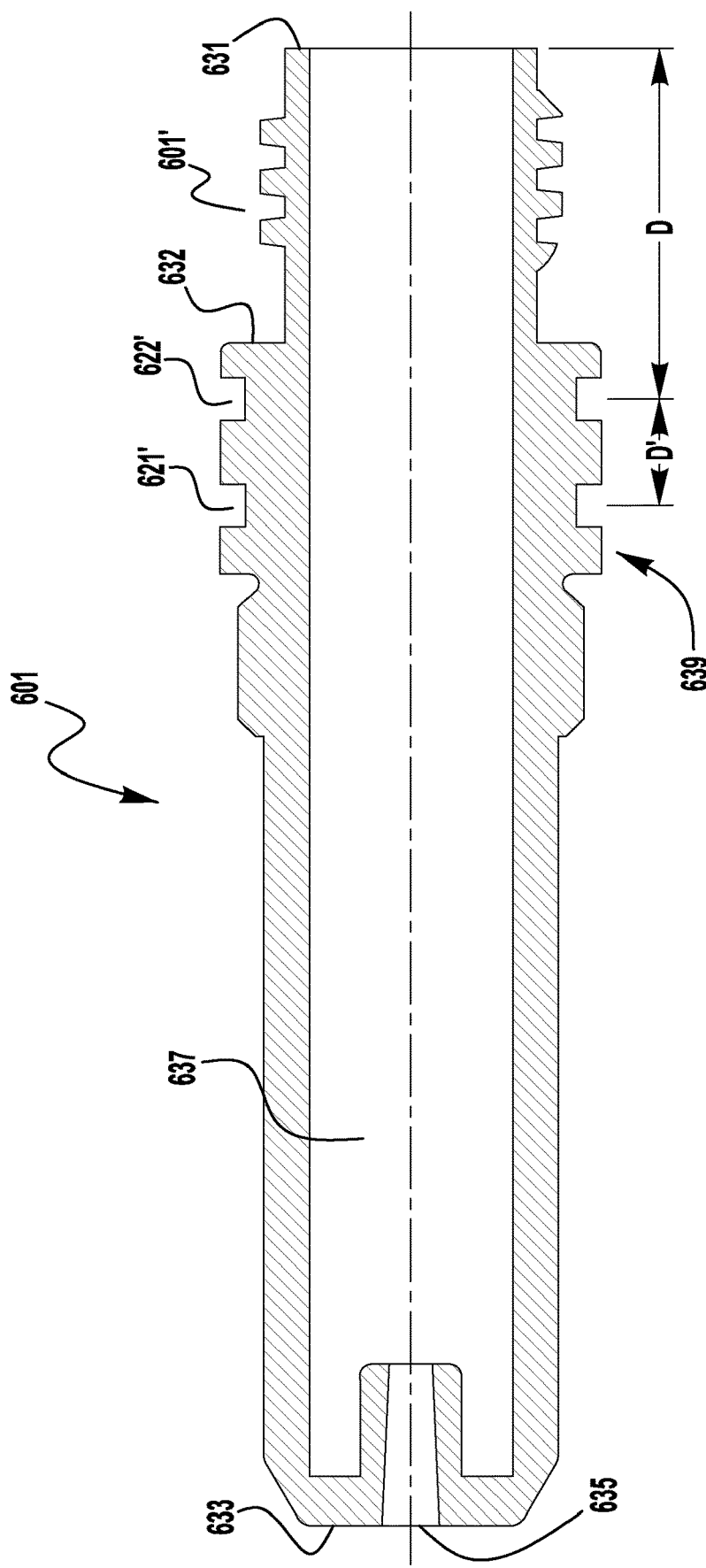
FIG. 9 is a diagrammatical representation of the electrode shown in FIG. 6.

FIG. 9 depicts an exemplary cross-section of the exemplary electrode 601. The electrode 601 has an upstream end 631 with an opening for the cooling cavity 637, and a distal end 633 with an opening 635 for an insert, which can be a hafnium insert or the like. The electrode has a thread portion 601' as described above. Downstream of the thread portion 601' is a shoulder 632 which separates the thread portion 601' from the o-ring portion 639. The o-ring portion 639 has at least two o-ring grooves 621' and 622'. Additionally, in exemplary embodiments, the o-ring portion 639 and o-ring grooves 621' and 622' are positioned such that the distance D along the length of the electrode 601, as measured from the upstream end 631 to the center of the first groove 622', is in the range of 20 to 25% of the overall length of the electrode (from upstream end 631 to the distal end 633). Additionally, the distance D' between the centers of each of the respective grooves 621' and 622' is in the range of 5 to 10% of the overall length of the electrode 601. This geometry, coupled with the above described thread configuration allows the electrode 601 to be easily installed having a high level of concentricity in the torch 600.

Figure 10A:
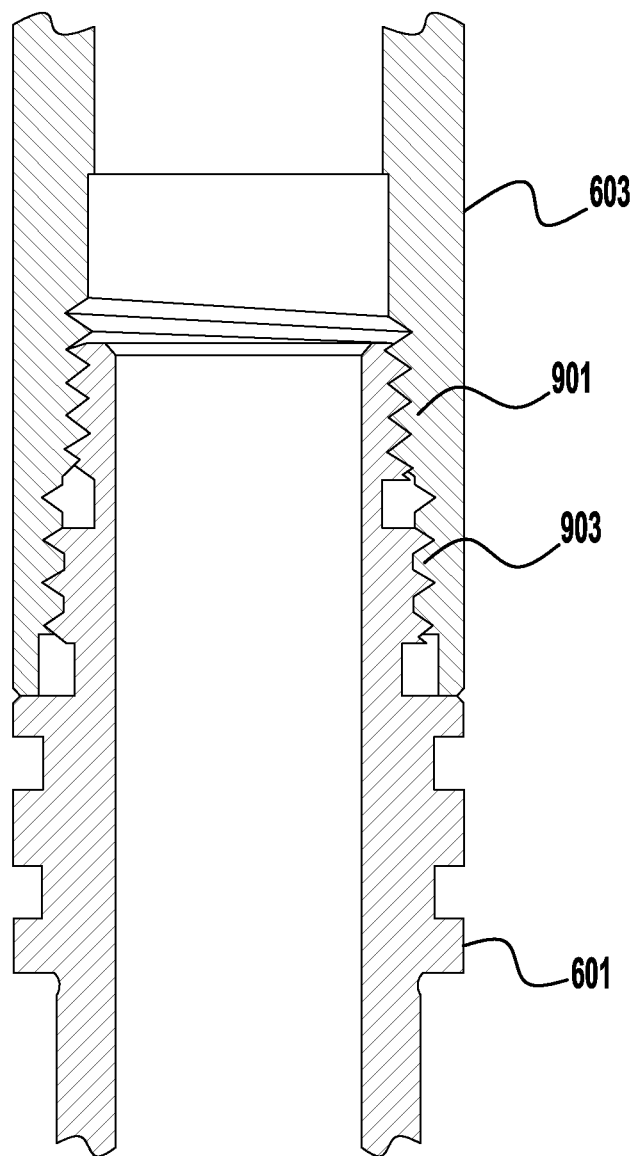

FIGS. 10A through 10C depict a further exemplary embodiment of the present invention. As shown in these Figures, an additional threaded connection is shown. However, in this embodiment, the threaded connection has a first threaded section 901 and a second threaded section, where the sections use different thread configurations. This configuration utilizes two different threaded connections to provide a secure connection between the electrode 601 and the cathode body 603. Like the connections discussed above, this type of configuration also provides improved concentricity while ensuring a secure fitment between components. Additionally, such a connection configuration increases the durability and connectivity of the coupling between components. Further detail is shown in FIGS. 10B and 10C. It is noted that the electrode and cathode shown in these figures can have a similar overall configuration and function of the other embodiments, described herein. For example, the electrode 601 can have a distal end with an emissive insert (e.g., hafnium), as shown in FIG. 9.

FIG. 10B depicts an exemplary cathode body 603 (only the distal end portion is shown) and FIG. 10C depicts an exemplary upstream end of the electrode 601. Each of the first and second threaded sections 901/903 have a single spiral thread. However, the threads in each respective section are different. For example, the threads-per-inch in each of the respective sections is different. As an example, in some embodiments the first section 901 has a thread within the range of 20 to 28 TPI, and the second section 903 has a thread within the range of 16 to 24 TPI, where the thread of the second section 903 has a smaller TPI than the first section 901. In an exemplary embodiment, the first section 901 has 24 TPI, while the second section has 20 TPI. The pitch and TPI of the respective threads should be selected to ensure smooth engagement of the respective threads in each respective section. If this is not achieved, it could result in binding when installing the electrode 601 within the cathode body.

Further, while in some exemplary embodiments, the thread cross-sectional geometry can be the same, in other embodiments, the respective threads can have different cross-section geometries. For example, in exemplary embodiments, the thread of the first section 901 can have a large depth (from crest to root) than the thread of the second section 903. Further, in additional exemplary embodiments the root widths of the respective threads can be different. In the embodiment shown, the threads in each of the sections have a truncated cone cross-section so that the respective crests and roots do not have a sharp point and this a stress concentration.

Further, as shown, the first section 901 has a smaller diameter than the second section 903. On the cathode body 603, each of the respective sections have a major and minor diameter, for each of the respective components, as shown in FIGS. 10B and 10C. In exemplary embodiments of the present invention, in the cathode 603, the major diameter of the first section DM1 has a smaller diameter (as measured across the cross-section of the cathode) than the minor diameter of the second section Dm2. In some exemplary embodiments, the major diameter of the first section DM1 has the same diameter as the minor diameter of the second section Dm2. Similarly, with respect to the electrode 601, in exemplary embodiments the major diameter of the first section DM1' has a smaller diameter than the minor diameter of the second section Dm2'. In some exemplary embodiments, the minor diameter of the second sections, in each of the electrode and cathode, is in the range of 2 to 6% larger than the major diameter in each of their respective first sections. In further exemplary embodiments, the minor diameter of the second sections, in each of the electrode and cathode, is in the range of 3 to 5% larger than the major diameter in each of the respective first sections. For purposes of reference, Dm1 is the minor diameter of the first section of the cathode, DM2 is the major diameter of the second section of the cathode, Dm1' is the minor diameter of the first section of the electrode, and DM2' is the major diameter of the second section of the electrode. These can be dictated by the selected depths of the threads used in each respective sections.

In other exemplary embodiments, a combination of the above discussed modified square thread and a true square thread profile is utilized on adjoining male/female thread components. In a true square thread configuration, the included angle φ (discussed above, see for example FIG. 8) of the thread is in the range of 0 to 1 degrees. That is, the cross-section of the thread at the transition from the crest to wall or from the root to the thread wall is a right angle, or nearly a right angle. In other exemplary embodiments, the included angle is 0 degrees, such that the root to wall and/or crest to wall transition is a right angle. That is, in exemplary embodiments, some of the threaded connections discussed herein can have female threads with the included angles and geometry discussed previously, while the corresponding male threads have the square shape. In other exemplary embodiments, the opposite is true, where the male threads have the geometry characteristics discussed above, while the corresponding female threads are square. In either of the these embodiments, the root to crest relationships discussed above can be maintained to achieve the benefits described above. In other exemplary embodiments utilizing the near square thread configuration, the included angle is in the range of 0 to 4 degrees, and even further embodiments, the included angle for the nearly square thread is in the range of 0 to 10 degrees. In even further embodiments, the near square thread has an included angle in the range of 1 to 8 degrees.

This alternative relationship can be utilized on many of the connections discussed above using the described modified thread connections described herein. In certain exemplary embodiments, the use of the combined square and modified square threads can provide improved ease of connectability, as the overall contact surface area is reduced. However, it should be noted that, in some embodiments, this type of mated thread configuration would not be desirable for high current flow applications. That is, if high current is passed through the threads (for example, the electrode/electrode holder connection) then this thread configuration may cause high heat/current concentrations at the thread contact points. Thus, in some exemplary embodiments, these combined thread configuration is used in applications having a maximum current flow at or below 150 amps. In other exemplary embodiments, this configuration is used in embodiments, where the maximum current flow is at or below 65 amps. In further exemplary embodiments, this thread connection methodology is used for only purely mechanical connections, which have no current flow. In referring to at least FIG. 6, the above described connection can be used for the connection of the cap 605, the nozzle retaining cap 609, and the electrode 601, as examples.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

What is claimed is:

1. A component for a plasma cutting torch, said component comprising:
   a body portion; and
   a thread portion positioned on an outer surface of said body portion, where said thread portion comprises a male thread which has a crest with a crest width and a root with a root width, wherein a ratio between said crest width and said root width is in the range of 1.2 to 1.6, and where said male thread has angled sidewalls between said root and said crest, where said angled sidewalls have an included angle of 10 degrees,
   wherein said male thread has 12 turns per inch.

2. The component of claim 1, wherein said crest of said male thread has a height which creates a first gap between said crest and a corresponding root on an engaging female thread and said root has a depth which creates a second gap between said root and a corresponding crest on said engaging female thread, where said first gap is larger than said second gap.

3. The component of claim 1, wherein said crest of said male thread has a height which creates a first gap between said crest and a corresponding root on an engaging female thread and said root has a depth which creates a second gap between said root and a corresponding crest on said engaging female thread, and wherein a clearance provided by said first gap is different than a clearance provided by said second gap.

4. A component for a plasma cutting torch, said component comprising:
   a body portion having an inner surface; and
   a thread portion on said inner surface, where said thread portion comprises a female thread which has a crest with a crest width and a root with a root width, wherein a ratio between said crest width and said root width is in the range of 0.5 to 0.75, and where said female thread has angled sidewalls between said crest and said root, where said angled sidewalls have an included angle of 10 degrees,
   wherein said female thread has 12 turns per inch.

5. The component of claim 4, wherein said crest of said female thread has a height which creates a first gap between said crest and a corresponding root on an engaging male thread and said root has a depth which creates a second gap between said root and a corresponding crest on said engaging male thread, where said first gap is smaller than said second gap.

6. The component of claim 4, wherein said crest of said female thread has a height which creates a first gap between said crest and a corresponding root on an engaging male thread and said root has a depth which creates a second gap between said root and a corresponding crest on said engaging male thread, wherein a clearance provided by said first gap is different than a clearance provided by said second gap.

* * * * *